United States Patent [19]

Pendergrass

[11] Patent Number: 5,178,078
[45] Date of Patent: Jan. 12, 1993

[54] PROCESS AND APPARATUS FOR SOIL TREATMENT

[76] Inventor: David B. Pendergrass, 2505 Julian Blvd., Amarillo, Tex. 79102

[21] Appl. No.: 772,224

[22] Filed: Oct. 7, 1991

[51] Int. Cl.$^5$ .................... A01C 21/00; A01C 23/02
[52] U.S. Cl. .................... 111/128; 111/900; 111/118
[58] Field of Search ............. 111/128, 118, 119, 89, 111/90, 91, 900; 172/540, 554, 64, 27, 22

[56] References Cited

U.S. PATENT DOCUMENTS

| | | | |
|---|---|---|---|
| 2,649,061 | 8/1953 | Hawkins et al. | 111/6 |
| 2,866,422 | 12/1958 | Colson | 111/128 |
| 2,876,718 | 3/1959 | Vaughan | 111/7 |
| 3,171,498 | 3/1965 | Logan | 172/22 |
| 3,602,166 | 8/1971 | Peterson | 111/128 |
| 3,718,192 | 2/1973 | Rogers | 172/624 |
| 3,799,272 | 3/1974 | Watson | 172/611 |
| 3,967,564 | 7/1976 | Emling | 111/7 |
| 4,178,860 | 12/1979 | Hines et al. | 111/7 |
| 4,233,915 | 11/1980 | Kordon | 111/128 |
| 4,649,836 | 3/1987 | Overocker | 111/128 |
| 4,919,060 | 4/1990 | Cady | 111/128 |
| 4,960,060 | 10/1990 | Overocker | 111/128 |

FOREIGN PATENT DOCUMENTS

| | | | |
|---|---|---|---|
| 3439380 | 4/1986 | Fed. Rep. of Germany | 111/118 |
| 686656 | 9/1979 | U.S.S.R. | 111/119 |

OTHER PUBLICATIONS

Toro, Hydrojet 3000 Brochure, Dec. 1991.

Primary Examiner—Randolph A. Reese
Assistant Examiner—Spencer Warnick
Attorney, Agent, or Firm—Norman B. Rainer

[57] ABSTRACT

A process and apparatus are provided for improving the friability of soil. The process involves the upward blasting of compressed gas through nozzles, caused to penetrate the surface of the soil. The apparatus employs a hollow drum mounted upon a framework in manner to rotate about a horizontal axis. The drum has a cylindrical wall which holds a multitude of nozzles, each nozzle having a plurality of upwardly directed apertures. When the nozzles are in a vertically downward position penetrating the soil, a short duration pulse of air is passed through the nozzles.

5 Claims, 3 Drawing Sheets

FIG. I

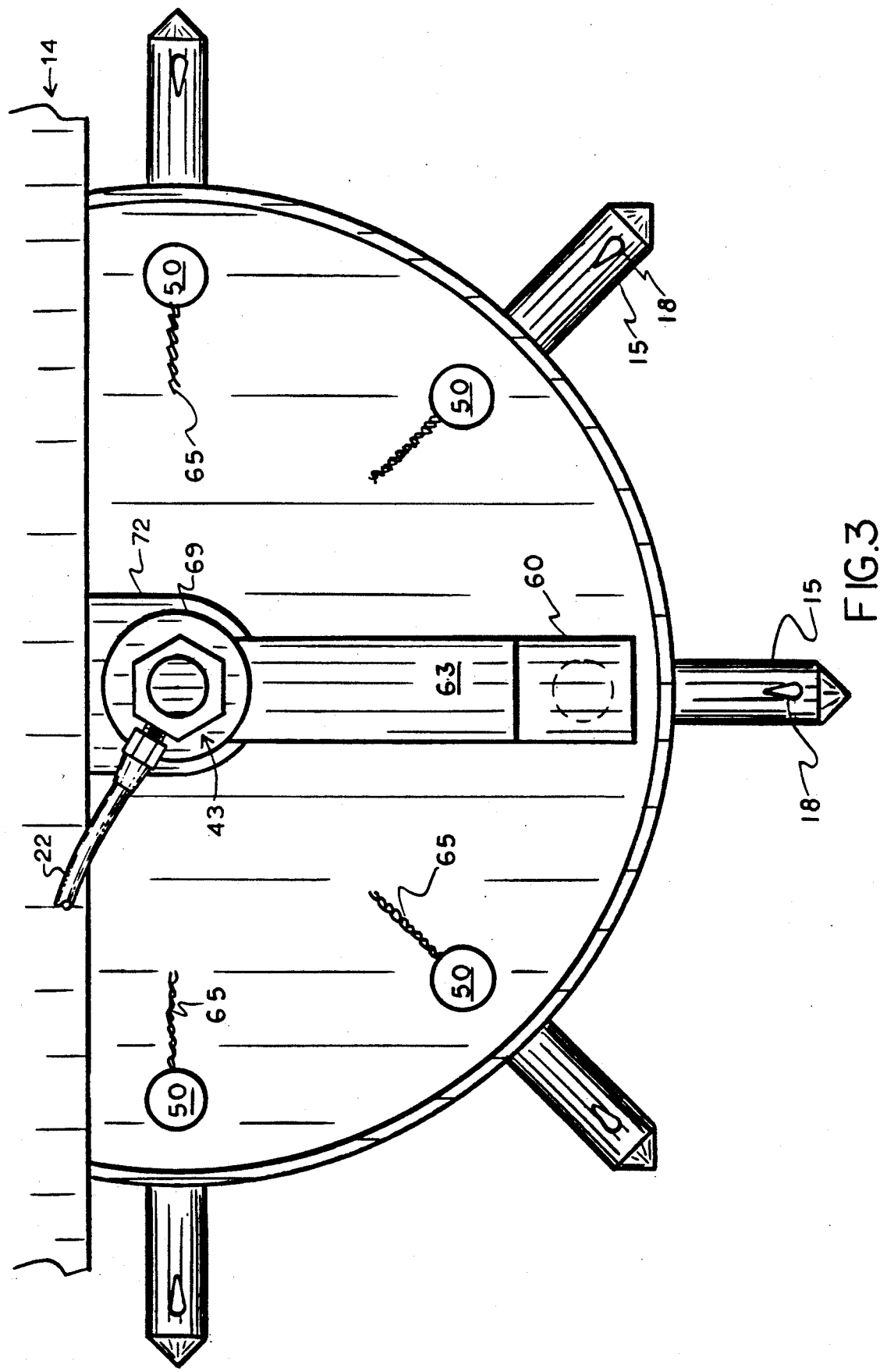

PROCESS AND APPARATUS FOR SOIL TREATMENT

BACKGROUND OF THE INVENTION

This invention relates to the loosening of the surface region of soil to improve the soil's ability to support vegetative growth, and further concerns motorized apparatus for achieving said effect.

Various soil-treating devices have been disclosed in which a multiplicity of spikes or prongs mounted to the outer surface of a cylindrical drum are caused to penetrate the soil. The drum is typically mounted upon a framework which is adapted to be either propelled by hand or pulled behind a tractor or other farm vehicle. The depressions or holes left as the spikes are withdrawn serve to increase the propensity of the soil to absorb oxygen and hold water. In some instances such devices are intended to inject fertilizer into the soil, said fertilizer being in solution form or gaseous ammonia.

Often soil, which has been subjected to such aeration processes, is compacted due to the heavy weight of the aeration device and the penetration of the prongs. Other types of aeration devices such as disclosed in U.S. Pat. No. 3,794,121 serve to remove plugs of soil and vegetation and deposit said plugs upon the soil surface. Such devices often damage existing vegetation and roots. Still other types of aeration devices merely perforate the ground but do not loosen or break up the soil to improve its friability. A friable soil is one which is loose, easily powdered and soft, having a relatively high bulk volume, and containing entrained air.

In order to properly prepare soil such as farm land for planting, and to improve the soil to the benefit of existing plants, it is generally necessary to break up the soil to improve its ability to hold water. Such soil treatment is generally achieved by plowing, tilling and harrowing techniques. Although such energy intensive techniques break up a hard-caked soil, large clumps of earth are produced, and there is often interference with existing crops.

It is accordingly an object of the present invention to provide a process for improving the friability of soil which has previously been groomed for farming or supporting other vegetative growth.

It is another object of the present invention to provide a process of the aforesaid nature which will not damage vegetation or roots thereof.

Another object of this invention is to provide a process of the aforesaid nature which can simultaneously add gaseous ammonia to soil.

It is yet another object of the present invention to provide apparatus compatible with existing farming techniques for carrying out a process of the aforesaid nature.

These objects and other objects and advantages of the invention will be apparent from the following description.

SUMMARY OF THE INVENTION

The above and other beneficial objects and advantages are accomplished in accordance with the present invention by a process for improving the friability of soil comprising:

a) directing a stream of pressurized gas through a multitude of nozzle means disposed in a uniformly spaced array, b) causing said nozzle means to vertically penetrate at least 3 inches downwardly from the upper surface of said soil, and c) causing said gas to be released from said nozzle means as a pulse in an upward direction.

In a further aspect of the present invention, apparatus is provided for carrying out the aforesaid process, said apparatus being adapted to be pulled over the soil being treated, and comprised of:

a) a hollow drum having a cylindrical wall centered upon a horizontally disposed axis, said drum held within a framework and adapted to be rotated about said axis in the direction of travel of said apparatus, b) a multitude of elongated nozzles radially emergent from said wall, each nozzle having a pointed free extremity and an internal passage terminating in a plurality of apertures directed toward said drum, said nozzles arranged in a uniformly spaced array and adapted to penetrate said soil when rotated to a downwardly vertical orientation, c) means for supplying a gas at high pressure to said nozzles and adapted to be propelled in operative joinder with said framework, and d) valve means adapted to direct a pulse of said gas to each nozzle, said pulse timed to begin subsequent to the penetration of said soil by said nozzle at said downwardly vertical orientation and end prior to withdrawal of said nozzle from said soil.

In a preferred embodiment, the gas supply means may be in the form of an air compressor with associated connecting hoses, manifold, and solenoid valves. In other embodiments, the gas supply means may be in the form of a compressed gas cylinder filled with air or a mixture of air and anhydrous ammonia and pressurized to between 1500 and 2000 psi.

In some embodiments, the apparatus may have integral weighting means adapted to exert greater penetrative force upon the free extremities of said nozzles.

In further embodiments, the apparatus may have retractable wheels which may be deployed to transport said apparatus over roads or other surfaces not intended to be so treated, and to prevent damage to said nozzles from hard surfaces.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 3 is an enlarged fragmentary perspective view of the apparatus of FIG. 1.

DESCRIPTION OF THE PREFERRED EMBODIMENT

Figure 1:
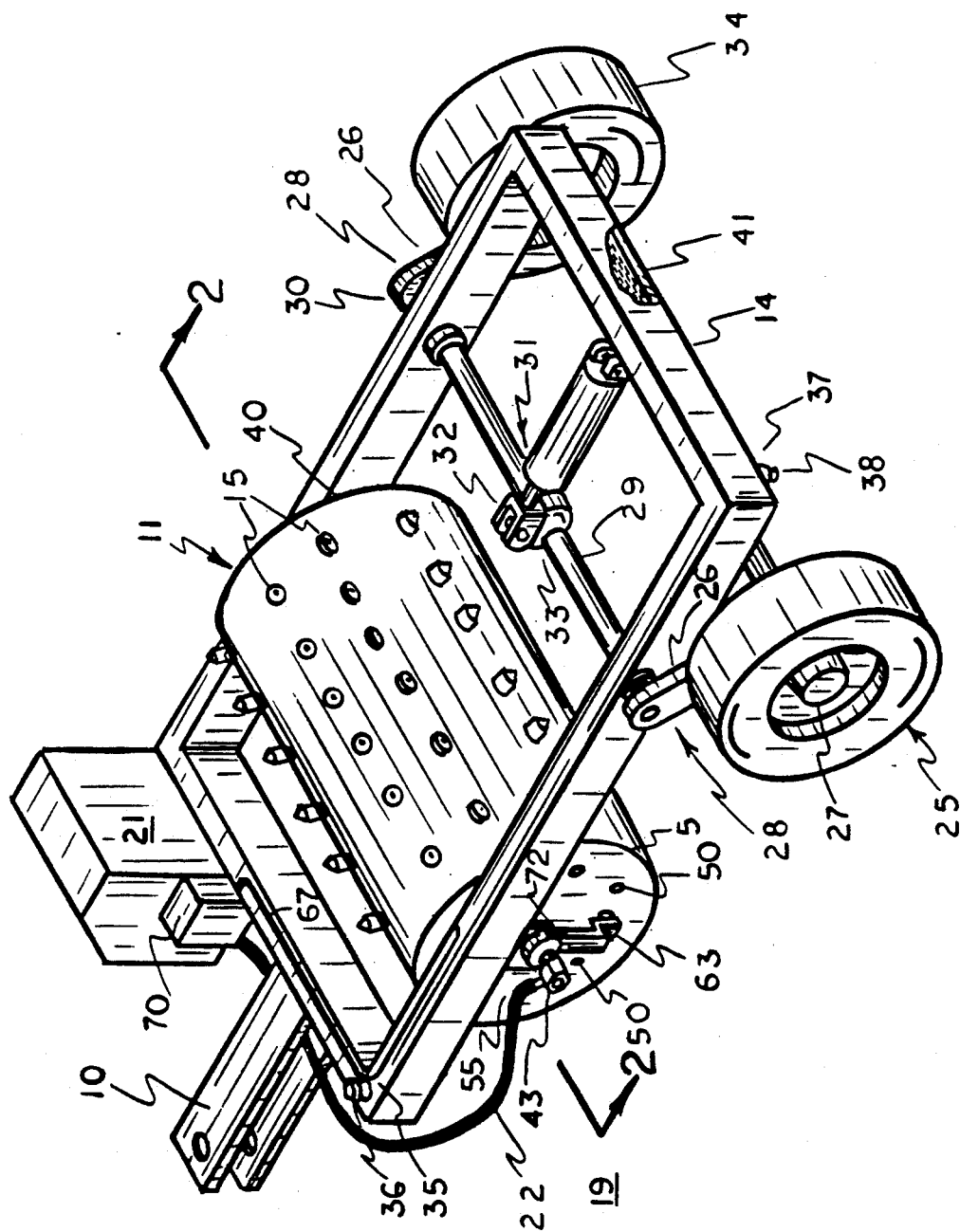
FIG. 1 is a perspective top and rear view of an embodiment of the apparatus of the present invention.
Figure 2:
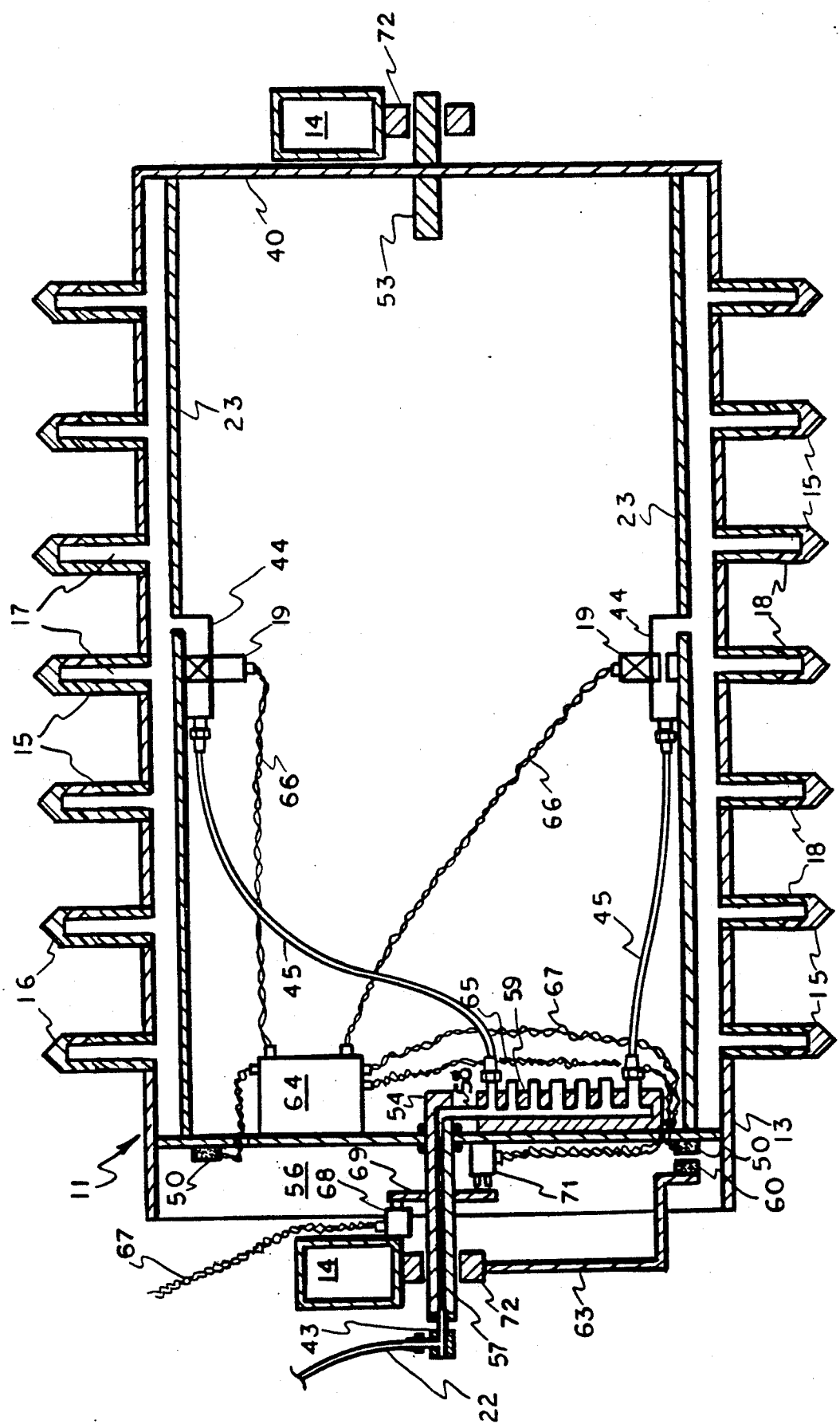
FIG. 2 is an enlarged vertical sectional view of the apparatus of FIG. 1.

Referring to FIGS. 1-3, an embodiment of the apparatus of the present invention is shown comprised of hollow drum 11 having flat end panels 40 and 55, cylindrical wall 13, and axle shafts 53 and 54 penetratively welded to the centers of end panels 40 and 55, respectively, and aligned upon a horizontal axis. Wall 13 extends beyond end panel 55 to form skirt region 56. Said drum is pivotably held within framework 14 by bearing blocks 72 which engage the extremities of said axles, and enable said drum to rotate in the direction of travel of the apparatus. A hitch portion 10 is attached to said framework to facilitate pulling of the apparatus by a vehicle.

Elongated nozzles 15 emerge radially from wall 13. Each nozzle 15 has a pointed free extremity 16 and internal passage 17 terminating in channeled apertures 18 directed toward the drum. The apertures form an angle with internal passage 17 of between 30 and 45 degrees. The nozzles of the illustrated embodiment are arranged in a uniformly spaced linear array and are adapted to penetrate the soil when rotated to a downwardly vertical orientation. Means in the form of compressor 21 for supplying air at high pressure to nozzles 15 is adapted to be propelled in operative joinder with framework 14. In alternative embodiments, the gas supply means may be in the form of a compressed gas cylinder. The gas is supplied at a pressure of 1500 to 2000 psi through supply line 22 which terminates in rotary coupling 43 that attaches to the outer extremity 57 of axle 54. A suitable commercially available rotary coupling is swivel joint BD55005, manufactured by the Aeroquip Corporation of Jackson, Mich. Such swivel joints enable a stationary hose to be joined to the axle of a rotating member. The gas supply is thence conveyed through the hollow center of axle 54 to an exit tube 58 that communicates with feeder manifold 59 attached to the interior surface of end panel 55.

Several supply manifolds 23 are attached to the interior surface of wall 13 uniformly spaced about the drum in parallel relationship to said axles. Each supply manifold 23 is adapted to provide pressurized gas to a row of nozzles 15 when the nozzles are in their vertically downward position. High pressure conduit tubes 45 communicate between manifold 59 and control blocks 44 associated with each supply manifold 23. An electrically operated solenoid valve 19 associated with each control block 44 controls the passage of high pressure gas from conduit tubes 45 into supply manifold 23.

Activation of solenoid valve 19 is controlled by magnetic switches 50 upraised from the exterior surface of end panel 55 in a uniformly spaced circular array and adapted to periodically contact a stationary magnet 60 held by arm 63 suspended from bearing block 38. As best shown in FIGS. 2 and 3, contact of stationary magnet 60 with magnetic switches 50 causes an electrical signal to be delivered through conductor wires 65 to control box 64 mounted upon the interior face of panel 55.

Control box 64 serves to activate appropriate solenoids based upon signals received through wires 65. In particular, control box 64 sends electrical power (such as 12 volts D.C.) through conductor wires 66 to solenoid valve 19. The electrical power routed to a solenoid valve causes the valve to open against the closing bias of a spring. When open, air flows through the solenoid valve into manifold 23 and thence through nozzles 15. The preferred duration of air movement through the nozzles is about 0.2 second, which is adequate to impart an explosive effect to the adjacent soil. Electrical energy, which may be 12 volts D.C., is supplied to control box 64 through conductor wires 67 which approach the drum from battery 70 mounted alongside the compressor. Wires 67 then attach to a first stationary two pronged electrode 68 which engages separate annular conductor paths in insulated disc 69 affixed orthogonally to shaft 54 within skirt region 56. A second two pronged electrode 71 attached to the exterior face of panel 55 contacts the corresponding annular conductor paths, and routes current thereby received through the continuation of wires 67 to control box 64.

Although the means for firing the high pressure gas into the soil at the appropriate instant has been exemplified by one particular embodiment, it is to be understood that alternative equivalent embodiments might be devised to achieve the same effect.

Integral weighting means in the form of a water filled cavity 41 resident within framework 14 is adapted to exert greater penetrative force upon extremities 16. Water may be added through fill apertures 35 upon the removal of fill plug 36. Water may be similarly removed from drain aperture 37 upon the removal of drain plug 38.

Retractable wheels 25 are adapted to transport the apparatus over roads or other surfaces not intended to be so treated, and to prevent damage to the nozzles from hard surfaces. Wheels 25 are rotatable about hubs 27 perpendicularly emergent from arms 26 at the lower extremities thereof. Upper extremities 28 of arms 26 are fixedly associated with shaft 29 at extremities 30. Shaft rotating means in the form of hydraulic cylinder 31, clevis 32 and activating lever 33 are employed to provide rotation to shaft 29 and thereby raise or lower the wheels. Tire tread surfaces 34 contact the ground when the apparatus is raised for transport.

In the lowered position of the framework, the nozzles penetrate the surface of the soil and the drum is thereby rotated when the apparatus is pulled by a vehicle. As each row of nozzles successively penetrates the surface of soil, a pulse of gas is released through apertures 18. The high pressure gas is blasted upwardly, thereby loosening the soil and optionally providing ammonia for fertilization. The loosened soil may be characterized as comprised of small pieces or clumps, having been broken away from a previously crack-free, tightly compacted soil. Furthermore, the surface of the loosened soil is slightly above the surface of the compacted soil. The drum does not re-compact the loosened soil. The loosened soil is more friable and more amenable to supporting vegetative growth.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A process for improving the friability of soil comprising:
    a) directing a stream of pressurized gas through a multitude of nozzle means disposed in a uniformly spaced array about a hollow drum,
    b) causing said nozzle means to vertically penetrate at least 3 inches downwardly from the upper surface of said soil, and
    c) causing said gas to be released from said nozzle means as a pulse aimed in an upward direction, said pulse being controlled by switches of an electrical system which are activated by rotation of said hollow drum, said pulse having a duration between about 0.1 and 0.3 second.

2. The process of claim 1 wherein said gas is compressed air.

3. Apparatus for improving the friability of soil comprising:
   a) a framework mounted upon wheels and adapted to be pulled behind a vehicle,
   b) a hollow drum having a cylindrical wall centered upon a horizontally disposed axis, said drum held within said framework and adapted to be rotated about said axis in the direction of travel of said apparatus,
   c) a multitude of elongated nozzles radially emergent from said wall, each nozzle having a pointed free extremity and an internal passage, said internal passage terminating in a plurality of apertures directed toward said drum, said nozzles arranged in a uniformly spaced array and configured to penetrate said soil when rotated to a downwardly vertical orientation,
   d) means for supplying a gas at high pressure to said nozzles and adapted to be propelled in operative joinder with said framework,
   e) solenoid valves adapted to direct a pulse of said gas to said nozzles, said pulse timed to begin subsequent to the penetration of said soil by said nozzle at said downwardly vertical orientation and end prior to withdrawal of said nozzle from said soil, and
   f) magnetic switches uniformly disposed about said drum and interactive with a stationary magnet associated with said framework in a manner to activate said solenoid valves.

4. Apparatus of claim 3 further provided with means to lower said wheels and thereby elevate said nozzles out of contact with the soil.

5. Apparatus of claim 4 wherein said framework contains a hollow chamber capable of holding water for the purpose of generating greater downward force upon said nozzles.

* * * * *